United States Patent
Laskowski (10) Patent No.: US 9,897,013 B2
(45) Date of Patent: Feb. 20, 2018

(54) SYSTEMS AND METHODS FOR DETERMINING GAS TURBINE OPERATING SPACE

(71) Applicant: General Electric Company, Schenectady, NY (US)

(72) Inventor: Benjamin David Laskowski, Greenville, SC (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 14/843,009

(22) Filed: Sep. 2, 2015

(65) Prior Publication Data
US 2017/0058785 A1 Mar. 2, 2017

(51) Int. Cl.
*G05B 15/00* (2006.01)
*F02C 9/28* (2006.01)
*G05B 19/042* (2006.01)

(52) U.S. Cl.
CPC .............. *F02C 9/28* (2013.01); *G05B 19/042* (2013.01); *F05D 2270/44* (2013.01); *F05D 2270/71* (2013.01); *G05B 2219/2639* (2013.01)

(58) Field of Classification Search
CPC ................................. F02C 9/28; G05B 19/042
See application file for complete search history.

(56) References Cited

U.S. PATENT DOCUMENTS

| 7,742,904 | B2 | 6/2010 | Healy et al. |
| 8,423,161 | B2 | 4/2013 | Wilkes et al. |
| 2007/0073525 | A1 | 3/2007 | Healy et al. |
| 2008/0243352 | A1* | 10/2008 | Healy ............. F01D 17/00 701/100 |
| 2009/0113896 | A1* | 5/2009 | Fukuda ............ F02C 6/08 60/784 |
| 2010/0089067 | A1 | 4/2010 | Wilkes et al. |
| 2010/0133831 | A1* | 6/2010 | Scholte-Wassink .. F03D 7/0292 290/44 |
| 2014/0020400 | A1* | 1/2014 | Ceccherini ......... F02C 9/54 60/773 |

* cited by examiner

*Primary Examiner* — Vincent Tran
(74) *Attorney, Agent, or Firm* — Armstrong Teasdale LLP (57) ABSTRACT

A system is provided. The system includes a gas turbine, the gas turbine having an operating space during operation and a current operating point during operation, a computing device communicatively coupled to the gas turbine and configured to calculate, based on the current operating point of the gas turbine, the operating space for the gas turbine by solving for a plurality of corner points that define the operating space, and display, to a user, a graph that includes the calculated operating space and the current operating point.

20 Claims, 3 Drawing Sheets

SYSTEMS AND METHODS FOR DETERMINING GAS TURBINE OPERATING SPACE

BACKGROUND

The field of the disclosure relates generally to turbine engines, and more particularly to determining an operating space for a gas turbine.

At least some known gas turbine engines include at least one compressor, a combustor, and a high-pressure turbine coupled together in a serial flow relationship. More specifically, the compressor and high-pressure turbine are coupled through a shaft to form a high-pressure rotor assembly. Air entering the turbine engine is mixed with fuel and ignited to form a high energy gas stream. The high energy gas stream flows through the high-pressure turbine to rotatably drive the high-pressure turbine such that the shaft rotatably drives the compressor and an electrical generator. Once the air leaves the high-pressure turbine, it typically enters a heat recovery steam generator (HRSG) that uses a large portion of the remaining thermal energy to boil and superheat water into steam used to drive a steam turbine for increased electrical power outputs.

Recent advances in variable load path (VLP) software have increased available operating space for gas turbines, allowing operators to control a gas turbine to operate anywhere within the operating space at a given point in time. However, accurately determining the boundaries of the operating space may be relatively difficult, especially in real time when the turbine is online. At least some known systems use offline data runs (outside of a control system), offline data reduction, and table lookup of parameters in the actual control system to estimate an operating space. However, this generally requires dedicated offline data analysis and a separate offline system.

BRIEF DESCRIPTION

In one aspect, a system is provided. The system includes a gas turbine, the gas turbine having an operating space during operation and a current operating point during operation, a computing device communicatively coupled to the gas turbine and configured to calculate, based on the current operating point of the gas turbine, the operating space for the gas turbine by solving for a plurality of corner points that define the operating space, and display, to a user, a graph that includes the calculated operating space and the current operating point.

In another aspect, a computing device is provided. The computing device includes a communications device configured to communicatively couple the computing device to a gas turbine having an operating space during operation and a current operating point during operation, a memory device configured to store the current operating point of the gas turbine, a processor communicatively coupled to said memory device and configured to calculate, based on the current operating point, the operating space for the gas turbine by solving for a plurality of corner points that define the operating space, and a display device communicatively coupled to said processor, said display device configured to display a graph that includes the calculated operating space and the current operating point.

In another aspect, a method for operating a gas turbine having an operating space during operation and a current operating point during operation is provided. The method includes determining, using a computing device communicatively coupled to the gas turbine, the current operating point of the gas turbine, calculating, using the computing device, based on the current operating point, the operating space for the gas turbine by solving for a plurality of corner points that define the operating space, and displaying to a user, using the computing device, a graph that includes the calculated operating space and the current operating point.

DETAILED DESCRIPTION

The embodiments described herein facilitate calculating and displaying an operating space for a gas turbine in real time, allowing operators to see how close the machine is to operating boundaries. Because the calculations are based on a current machine state, including sensed inputs, the displayed operating space automatically adapts to changing ambient conditions. Further, since the computed corner points take scheduled boundaries into account, the computed points are updated in near-real time as plant operators change operating modes of a power plant, toggle boundaries, etc.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
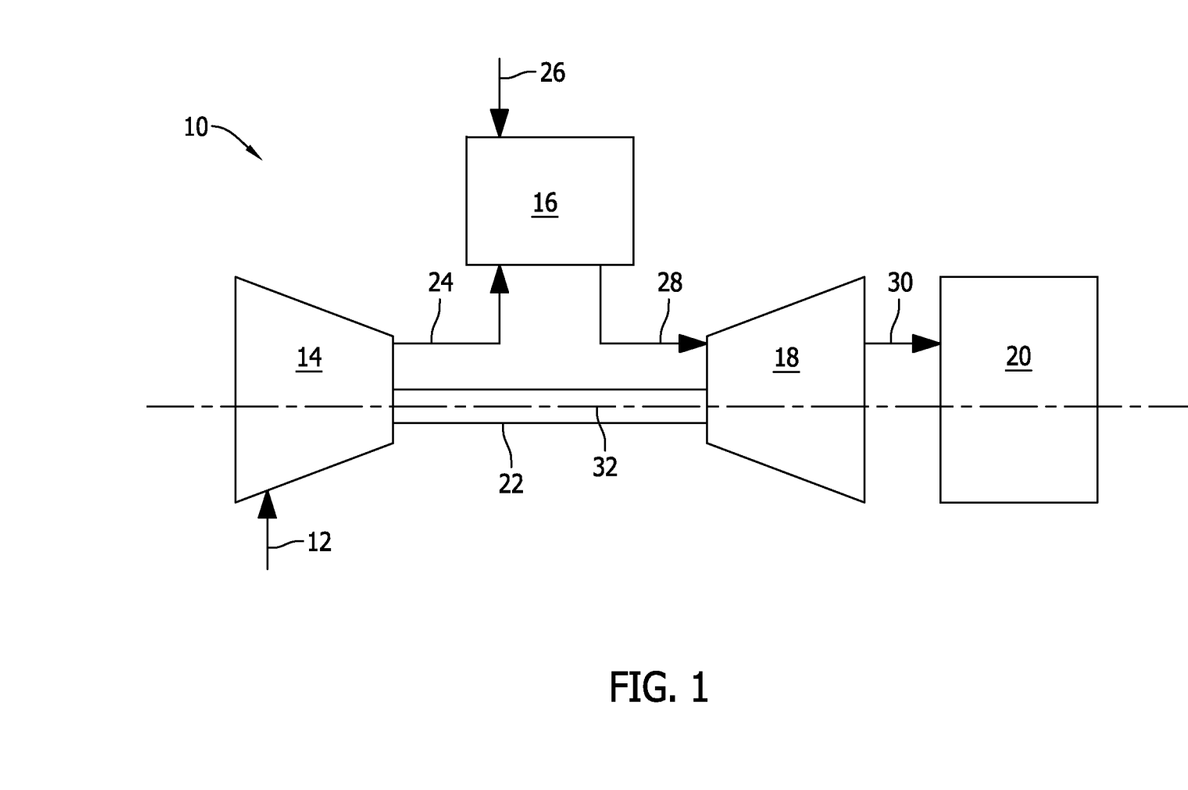
FIG. 1 is a schematic diagram of an exemplary embodiment of a gas turbine.

FIG. 1 is a schematic diagram of an exemplary turbine engine 10 with which embodiments of the current disclosure may be used. In the exemplary embodiment, turbine engine 10 is a gas turbine that includes a compressor section 14, a combustor section 16 coupled downstream from compressor section 14, a turbine section 18 coupled downstream from combustor section 16, and an exhaust section 20 coupled downstream from turbine section 18.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components. Rotor shaft 22 defines a centerline axis 32 of gas turbine 10. Unless otherwise stated, the term "axially" refers to a direction parallel to centerline axis 32, and the term "radially" refers to a direction radially outward from centerline axis 32.

During operation of gas turbine 10, compressor section 14 receives an air flow 12. Compressor section 14 converts mechanical rotational energy from rotor shaft 22 to compress air flow 12 to a higher pressure and temperature.

Compressor section 14 discharges a flow of compressed air 24 to combustor section 16. In combustor section 16, compressed air 24 is mixed with a flow of fuel 26 and ignited to generate combustion gases 28 that are channeled towards turbine section 18. Turbine section 18 converts thermal energy from combustion gases 28 to mechanical rotational energy of rotor shaft 22. Rotor shaft 22 may be coupled to a load (not shown) such as, but not limited to, an electrical generator and/or a mechanical drive application. Turbine section 18 emits a flow of exhausted combustion gases 30 downstream into exhaust section 20.

The systems and methods described herein facilitate using an existing online model of a gas turbine, such as turbine engine 10, to compute operational boundaries of the gas turbine in real time. These boundaries may then be plotted alongside an operating point of the gas turbine to enable a power plant operator (i.e., a user) to determine relatively quickly and easily how close the gas turbine is operating to the boundaries. This gives a degree of predictability to power plant operations, especially when operators are using relatively new gas turbine products.

The embodiments described herein extend Newton's Method into multiple dimensions to invert a nonlinear gas turbine model, including machine boundaries that are defined as functions of internal states. As explained below, a series of corner points are solved for. The corner points define the physical boundaries of the operating space for the gas turbine. These corner points may be any input, state, or output of the underlying gas turbine model.

In the exemplary embodiment, to solve for the corner points, the gas turbine's current operating point is taken as a guess at the solution for all corner points of the operating space. The difference between the desired corner point (i.e., the "target" point) and the current operating point is computed. This results in a difference vector that is used in a later computation step.

Next, the current operating point of the gas turbine is perturbed to estimate partial derivatives of the point with respect to fuel flow and an inlet guide vane (IGV) angle of the gas turbine. Fuel flow and IGV angle perturbations may be fed into the model on alternate execution frames to reduce CPU load and software complexity. The resulting partial derivatives are then assembled into a Jacobian matrix. The Jacobian matrix is then inverted and multiplied by the difference vector to generate a change vector that represents the required change in fuel flow and IGV angle to move toward the target point. The change vector is then used to update a state vector (i.e., initially the current operating point) internal to the solver, and the process is repeated on the updated state vector.

In the exemplary embodiment, before repeating the calculation with the updated state vector, additional machine targets and boundaries that are scheduled as a function of model states are computed. These boundaries control parameters such as firing temperature, inlet heating system flow, and target temperatures for multiple internal parts of the gas turbine. These scheduled boundaries drive additional inputs to the model, as described herein.

The updated state vector and the scheduled boundaries are then fed into the model to repeat the partial derivative and model computation. The process repeats iteratively until the change vector magnitude is below a predetermined, settable threshold (e.g., indicating convergence) or until a predetermined number of iterations has been reached.

Upon convergence, the final corner points are reported as a megawatt output and exhaust temperature in the exemplary embodiment. The series of corner point definitions are arranged such that plotting the points on a plot of megawatt output versus exhaust temperature yields a closed figure that represents available operating space. Notably, scheduled boundaries that are input to the solver may be changed by the operator during normal operation of a power plant including the gas turbine. Because the solver runs continuously in the background of a control system, such updates are reflected in computed outputs relatively quickly.

Figure 2:
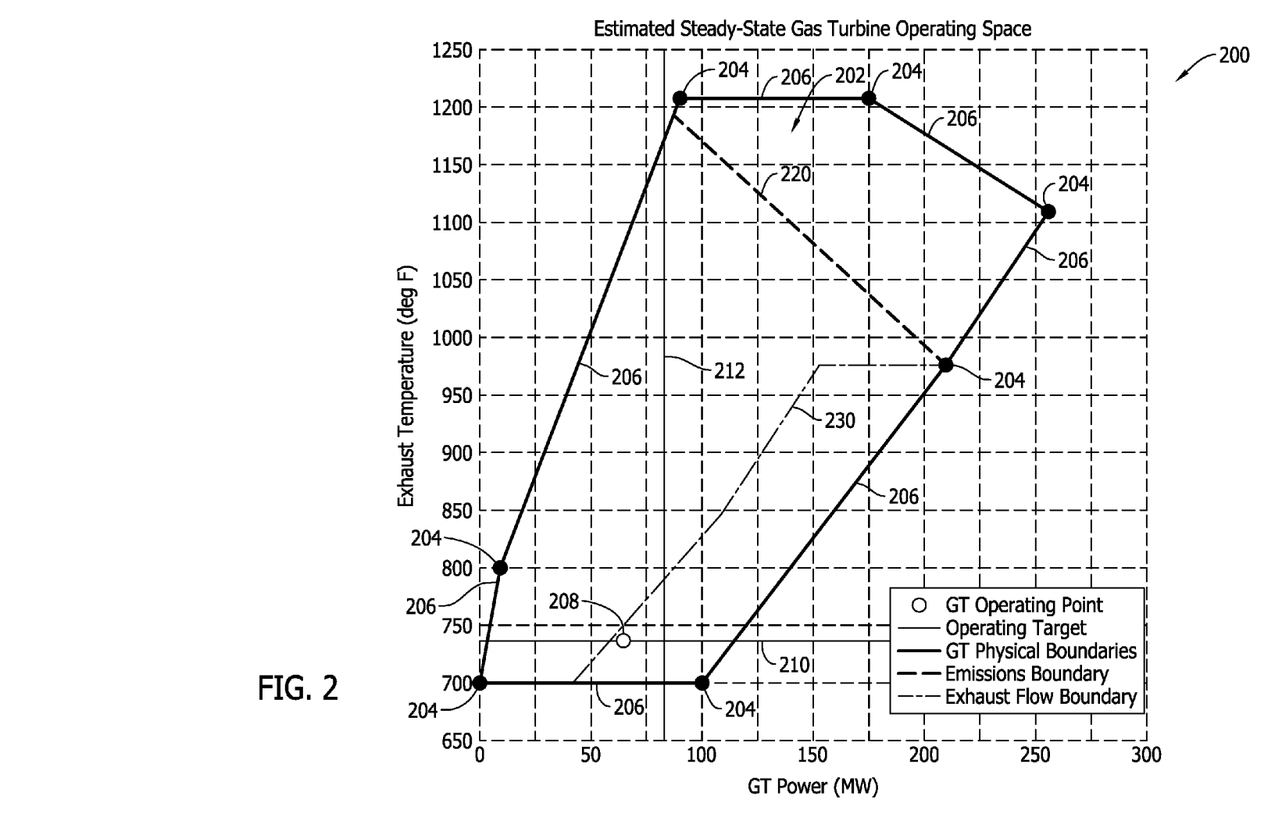
FIG. 2 is a graph illustrating an exemplary operating space for a gas turbine.

FIG. 2 is a graph 200 plotting exhaust temperature versus megawatt output power for a gas turbine, such as turbine engine 10 (shown in FIG. 1). As shown in FIG. 2, an operating space 202 for the gas turbine is defined by a plurality of corner points 204. Specifically, lines between corner points 204 form operating boundaries 206 that define operating space 202. Further, a current operating point 208 of the gas turbine is also displayed on graph 200. Graph 200 also includes a horizontal line 210 and a vertical line 212 that form a crosshairs centered upon a load and exhaust temperature requested by the operator.

As described above, the systems and methods described herein facilitate solving for corner points 204. In the exemplary embodiment, corner points 204 are solved for using variable load path (VLP) software operating on a computing device.

Figure 3:
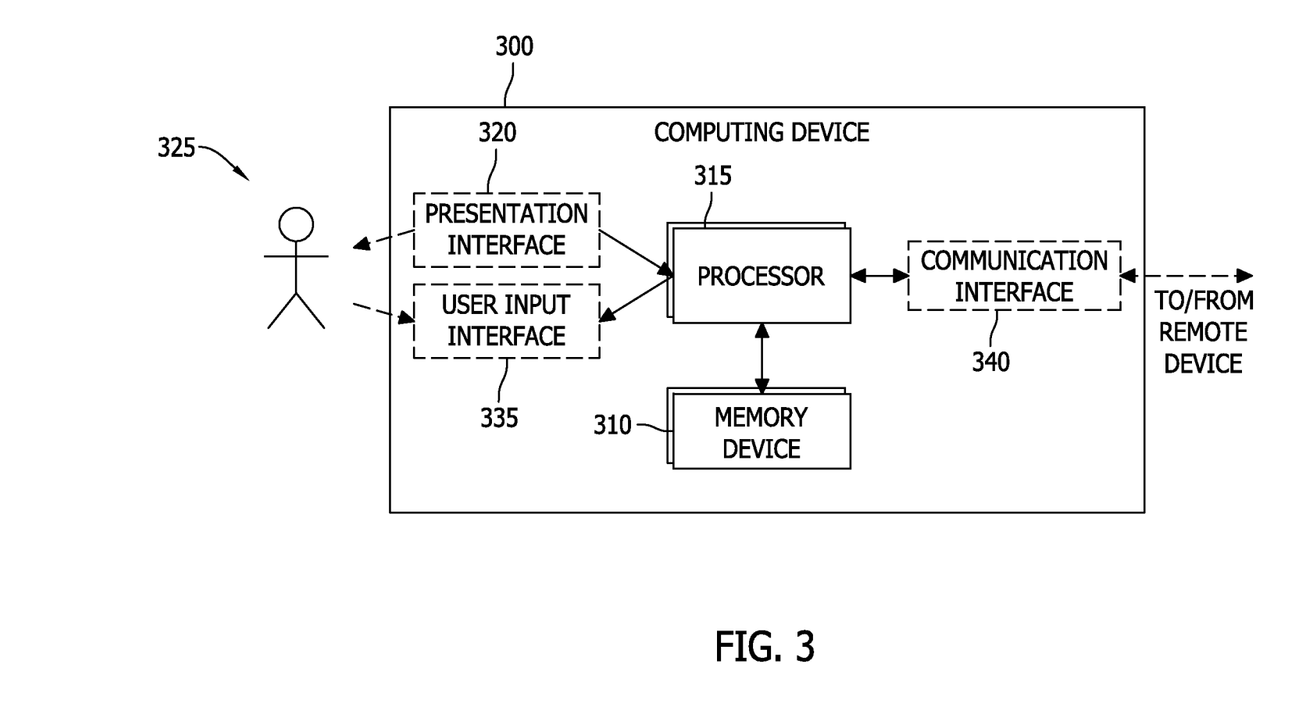
FIG. 3 is block diagram of an exemplary computing device that may be used to calculate and display the operating space shown in FIG. 2.

FIG. 3 is a block diagram of a computing device 300 that may be used to implement the methods described herein. Computing device 300 is communicatively coupled to gas turbine 10 in the exemplary embodiment, and accordingly, may be include within gas turbine 10 or provided separately from gas turbine 10. Corner points 204 may be solved for using computing device 300. Computing device 300 includes at least one memory device 310 and a processor 315 that is coupled to memory device 310 for executing instructions. In some embodiments, executable instructions are stored in memory device 310. In the exemplary embodiment, computing device 300 performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. In another illustrative example, processor 315 may be a symmetric multi-processor system containing multiple processors of the same type. Further, processor 315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data.

In the exemplary embodiment, computing device 300 includes a presentation interface 320 that is coupled to processor 315. For example, computing device 300 may include a controller (i.e., that calculates corner points 204 and controls gas turbine 10 as described herein) communicatively coupled to a human machine interface (HMI) via Ethernet global data (EGD). Presentation interface 320 presents information to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 320 includes one or more display devices. In the exemplary embodiment, graph 200 is displayed on presentation interface 320 so that an operator can view graph 200.

In the exemplary embodiment, computing device 300 includes a user input interface 335. User input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

Computing device 300, in the exemplary embodiment, includes a communication interface 340 coupled to processor 315. Communication interface 340 communicates with one or more remote devices. To communicate with remote devices, communication interface 340 may include, for example, a wired network adapter, a wireless network adapter, and/or a mobile telecommunications adapter.

As indicated above, computing device 300, computes corner points 204 that together define operating space 202 for a gas turbine. Operating space 202 is defined based on ambient conditions, operator-selected boundaries, and machine degradation. Notably, in the exemplary embodiment, none of these outputs are placed in control of computing device 300 or gas turbine 10. That is, the outputs may influence operator decisions, but do not themselves control gas turbine 10. Accordingly, computing device 300 is designed to help the operator visualize the available operating space 202, and determine where the gas turbine is currently operating relative to operating boundaries 206. As described in detail below, computing device 300 solves for corner points 204 by extending Newton's Methods into multiple dimensions to "invert" multivariable nonlinear functions defined by an adaptive real time engine simulation model (ARES) and scheduled machine boundaries. ARES is discussed in detail in U.S. Pat. No. 7,742,904, issued on Jun. 22, 2010, which is incorporated by reference in its entirety herein.

In the exemplary embodiment, the following corner points 204 are used to define operating space 202: a) a minimum simple-cycle exhaust temperature (e.g., 700° F.) and 0 megawatt (MW) output power; (b) 800° F. and a minimum IGV angle; (c) an isotherm (i.e., a maximum exhaust temperature) on the minimum IGV angle; (d) an intersection for the isotherm and a firing temperature (TFire) target; (e) TFire target at the average exhaust temperature of (d) and (f); (f) TFire maximum on a maximum IGV angle; (g) intersection of an emissions boundary (EMB) and the maximum IGV angle lines; (h) the maximum IGV angle at an average exhaust temperature of (g) and (i); and (i) a minimum simple-cycle exhaust temperature on the maximum IGV angle. Notably, points (e) and (h) are intended to smooth the plot of operating space 202, and are not explicit corner points. Further, point (i) connects to point (a) to generate a closed shape formed by operating boundaries 206. In the exemplary embodiment, the corner points are solved for sequentially (e.g., solve for point (a) first, solve for point (b) second, solve for point (c) third, etc.). By refining the estimated solution for each point sequentially over a number of consecutive execution periods, CPU usage may be kept relatively low.

When EMB 220 is enabled, the following additional points may be displayed on graph 200: (j) a minimum combustion reference temperature (CRT) on the isotherm or minimum IGV angle; (k) the minimum CRT on the maximum IGV angle; and (l) the minimum CRT at the average of the megawatt output of (h) and (i). Point (I) is intended to smooth the plot, and is not an explicit corner point.

Further, when an exhaust flow boundary 230 is enabled, the following additional points may be displayed on graph 200: (m) the point given by (exhaust temperature, exhaust flow)=(VLPWXB_LOC_T0, VLPWXB_LOC_W0); (n) the point given by (exhaust temperature, exhaust flow)=(VLPWXB_LOC_T1, VLPWXB_LOC_W1); (o) the point given by (exhaust temperature, exhaust flow)=(VLPWXB_LOC_T2, VLPWXB_LOC_W2); (p) the point given by (exhaust temperature, exhaust flow)=(VLPWXB_LOC_T3, VLPWXB_LOC_W3); and (q) the point given by (exhaust temperature, exhaust flow)=(VLPWXB_LOC_T4, VLPWXB_LOC_W4). These VLPWXB_LOC_TN and VLPWXB_LOC_WN points define an array of permissible exhaust flow values as a function of exhaust temperature.

Because the exhaust flows prescribed by VLPWXB_LOC_W4 (i.e., the exhaust flow at the maximum exhaust temperature for which exhaust flow boundary 230 is defined) may not necessarily be reachable under a given set of ambient conditions, an additional point may be computed to determine a maximum possible exhaust flow that would define the boundary. This maximum flow is found by solving for the flow at the VLPWXB_LOC_T4 exhaust temperature (i.e., the maximum exhaust temperatures at which exhaust flow boundary 230 is defined) at the maximum IGV angle with no inlet bleed heat (IBH) flow. In the exemplary embodiment, only the exhaust flow boundary points having flows less than or equal to this value are actually computed; the rest are assigned to megawatt values interpolated from the computed maximum IGV angle line to avoid display glitches to the extent possible.

The corner points 204 described herein were chosen based on observation of how an operating point of gas turbine 10 shifts with various load and exhaust temperature setpoints. The minimum and maximum IGV angle and the minimum and maximum exhaust temperatures (simple-cycle and isotherm values, respectively) are physical limits of the machine. The target and maximum firing temperatures are limits set based partially on performance commitments and partially on hardware limits, and is responsible for the slanted operating boundary 206 on the upper right of graph 200.

EMB 220 is defined based on a minimum CRT, which is loosely the temperature of air exiting combustor section 16. This boundary correlates strongly with carbon monoxide production, making it a selectable model-based boundary based on whether the operator wants to prioritize exhaust temperature (e.g., during plant startup) or emissions (e.g., during normal operation).

Exhaust flow boundary 230 is defined based on limitations of a downstream heat recovery steam generator (HRSG) that contains a series of heat exchangers that use the energy in exhaust of gas turbine 10 to heat water and operate a steam turbine. The HRSG has certain limitations that drive a reduced exhaust flow at low exhaust temperatures.

In the exemplary embodiment, the overall set of corner points 204 is intended to capture the intersections of each of these boundaries with each other on graph 200. In doing so, the operator is presented with a display that traces the entire operating space 202 of gas turbine 10 based on balance-of-plant, environmental, and grid authority requirements.

As seen in the list of foregoing points, many combinations of machine boundaries and targets may be used to define corner points 204 of operating space 202. To enable solving for each point, computing device solves for corner points 204 in the following ways in the exemplary embodiment: (A) solve for fuel flow to meet given exhaust temperature with given IGV angle; (B) solve for fuel flow and IGV angle to meet given exhaust temperature and CRT; (C) solve for fuel flow to meet given firing temperature with given IGV; (D) solve for fuel flow to meet given CRT with given IGV angle; (E) solve for fuel flow and IGV angle to meet given CRT and megawatt output; (F) solve for fuel flow and IGV angle to meet given exhaust temperature and firing temperature; and (G) solve for fuel flow and IGV angle to meet given exhaust temperature and exhaust flow.

Because the gas turbine model and various scheduled boundaries are nonlinear, an iterative solution process is used in which the model is linearized at each step to determine the direction in which the proposed solution must move to approach the target corner points 204. In the exemplary embodiment, the solution process is broken into three phases—initialization, IGV perturbation, and fuel flow perturbation and solution checking. Alternatively, in some embodiments, it is possible to achieve the same results by perturbing only fuel flow, and leaving IGV to respond according to a simplified control mode. In this way, the solution process is reduced to two phases, and it may be easier to incorporate additional modeled boundaries.

In the initialization phase, ARES inputs and outputs are copied from a main ARES instance (i.e., the ARES instance modeling the machine's current state and in control of the machine) into local variables for use in the solver. By doing so, operating space computations are initialized from the gas turbine's current operating point (i.e., a fuel flow value and IGV angle value) before each corner point 204 is solved. This continuous refresh of the input array also ensures that a current set of ambient conditions is taken into account when computing corner points 204.

In the IGV perturbation stage, the IGV angle input to a second ARES block of computing device 300 is perturbed slightly, and the outputs are compared to a first ARES block to determine a sensitivity of each ARES output (e.g., exhaust temperature (TTXM), generator output power (DWATT), firing temperature (TFire), modeled combustion reference temperature (CRT), and exhaust mass flow (WX)) to the IGV angle (IGV). The change in the output is divided by the change in the input to give approximate numerical representations of $$\frac{\partial TTXM}{\partial IGV}, \frac{\partial WATT}{\partial IGV}, \frac{\partial TFire}{\partial IGV}, \frac{\partial CRT}{\partial IGV}, \text{ and } \frac{\partial WX}{\partial IGV}.$$

In the fuel flow perturbation stage, the gas fuel flow (FQG) input to the second ARES block of computing device 300 is perturbed slightly, and the outputs are compared to the first ARES block to determine a sensitivity of each ARES output to the gas fuel flow. The change in the output is divided by the change in the input to give approximate numerical representations of $$\frac{\partial TTXM}{\partial FQG}, \frac{\partial DWATT}{\partial FQG}, \frac{\partial TFire}{\partial FQG}, \frac{\partial CRT}{\partial FQG}, \text{ and } \frac{\partial WX}{\partial FQG}.$$

Further changes may be needed to adapt the solver to work with liquid fuel by selectively perturbing liquid fuel flow.

The remainder of the solution also executes during the fuel flow perturbation stage in the exemplary embodiment. Specifically, a distance between the computed outputs and the requested states is computed and multiplied by the inverse of the Jacobian generated from the appropriate partial derivatives. This gives the amount the ARES inputs must change to arrive at the required outputs. These changes are then scaled and added to the existing IGV and FQG states to give a new guess of the fuel and air that produce the desired output. For example, taking case (B) above, where exhaust temperature and CRT are the targets:

$$\begin{bmatrix} dTTXM \\ dCRT \end{bmatrix} =$$

$$\begin{bmatrix} TTXM_{desired} - TTXM_{calculated} \\ CRT_{desired} - CRT_{calculated} \end{bmatrix} = \begin{bmatrix} \left(\frac{\partial TTXM}{\partial FQG}\right) & \left(\frac{\partial TTXM}{\partial IGV}\right) \\ \left(\frac{\partial TTXM}{\partial FQG}\right) & \left(\frac{\partial CRT}{\partial IGV}\right) \end{bmatrix} \begin{bmatrix} dFQG \\ dIGV \end{bmatrix}$$

Solving for the change in FQG and IGV and scaling and integrating that change gives:

$$\begin{bmatrix} FQG \\ IGV \end{bmatrix}_{n+1} = \begin{bmatrix} FQG \\ IGV \end{bmatrix}_n +$$

$$\frac{1}{2} \begin{bmatrix} \left(\frac{\partial TTXM}{\partial FQG}\right) & \left(\frac{\partial TTXM}{\partial IGV}\right) \\ \left(\frac{\partial TTXM}{\partial FQG}\right) & \left(\frac{\partial CRT}{\partial IGV}\right) \end{bmatrix}^{-1} \begin{bmatrix} TTXM_{desired} - TTXM_{calculated} \\ CRT_{desired} - CRT_{calculated} \end{bmatrix}$$

In the case where only FQG is varied in an attempt to find a solution, the top-left element of the Jacobian is set to the partial derivative of the target value with respect to FQG, the bottom-right element is one, and the off-diagonal elements are zero. The Jacobian, when defined in this way, is guaranteed to be invertible, provided the partial derivative is non-zero.

In the exemplary embodiment, the factor of ½ is applied to reduce the convergence speed of the algorithm. Slowing the convergence improves the quality of the result by approaching the solution relatively slowly instead of oscillating around the solution. After computation of the required changes, a convergence flag may be set if the changes in IGV angle and fuel flow are small enough, and if the computed result is close enough to the original targets. If the calculation did not converge upon the desired result, the calculation is repeated with updated values of fuel flow and IGV angle. A count of the iterations that have been completed is maintained, and a different non-convergence flag is set when this counter exceeds a predetermined threshold. When convergence is reached, the fuel flow, IGV angle, megawatt output, exhaust temperature, and exhaust mass flow are made available to external logic.

In some embodiments, because any of a number of loops may be in control of the gas turbine at a given operating point, a control mode structure may be taken into consideration when solving for operating space 202. That is, three main cycle control inputs (fuel flow, IBH flow, and IGV angle) control many different modeled parameters (e.g., firing temperature, exhaust temperature, generator power output, combustion temperature, compressor protection, etc.). Since there are only three control inputs, their actions are prioritized to control the most important boundaries at a given operation point.

A simplified control mode may be used for the solver to determine how to change fuel flow and IGV angle to best approach desired points. For example, for fuel flow, the following priority may be used: (1.) maximum TFire too high (highest priority); (2.) exhaust temperature too high; (3.) CRT too low; and (4.) distance from desired target (lowest priority). For IGV angle, the following priority structure may be used: (1.) fixed IGV angle selected (highest priority); (2.) maximum TFire too high; (3.) exhaust temperature too high; (4.) CRT too low; and (5.) distance from desired target (lowest priority). Typically, both IGV and fuel flow changes will be determined by the lowest priority item. Only when the current state of the solver exceeds a physical or modeled machine boundary does a higher priority control loop begin to affect the estimated solution.

In the exemplary embodiment, ARES uses "knobs" to tune the model to the specific machine. These knobs allow for variation in machine performance brought about by aging, fouling, and/or hardware failures. The ARES knobs vary continuously during machine operation, and during transients such as mode transfers (i.e., when fuel is shifted from one set of gas fuel nozzles to another to better control emissions, dynamics, or pressure rations across various valves/nozzles), they may move quite rapidly. In order to present an accurate diagram of the gas turbine's available operating space 202, the current knobs are fed to the ARES models that produce graph 200. However, the knobs are processed first to ensure they are relatively stable.

The ARES knobs vary relatively little across the range spanned by each combustion mode; however, the knobs are rather different from one mode to the next. Therefore, a unique set of knobs is maintained by the solver macro for each combustion mode in the exemplary embodiment. An incoming live knob array is first copied into a local variable, then the local variable is filtered by a 30-second lag. The intermediate local variable is also filtered by a 90-second lag and stored in a knob array for the current combustion mode. The inputs to the 90-second lag block for all inactive combustion modes are set to the output of the respective lag blocks to effectively make a latch. Finally, the 30-second filtered knobs are divided by the 90-second filtered knobs from the current combustion mode to derive a set of ratios that normalize the current knobs to the saved states. The 30-second and 90-second time constants were chosen to represent a reasonable tradeoff between speed of responding to transients and learning typical knob values without being excessively slow. Alternatively, any suitable time constants may be selected.

As the operating space solver runs, it uses the computed CRT value for each corner point 204 to determine the combustion mode in which the machine would be expected to operate at that point. The ARES knobs the solver uses at that point are computed by multiplying the current 30-to-90-second knob ratio in the current combustion mode by the stored knobs (the 90-second lagged knobs) for that mode (i.e., the mode that the solver estimates the machine will be in at that corner point 204). Using this arrangement, the solver "learns" the typical knob values for each mode (via the 90-second filter) and uses the learned knobs from each mode to better predict how the machine will operate there. The actual knobs in control of the machine still affect the solver's predictions in all other combustion modes.

IBH operation also has a relatively large impact on available operating space 202, particularly in a general region defined by low exhaust temperature and high exhaust flow (shown in the bottom right of graph 200). Therefore, a simplified IBH model is included in the solver macro in the exemplary embodiment. The model assumes that any required IBH flow (up to an allowable maximum) can be achieved, that perfect mixing of heated air and ambient air occurs upstream of the compressor inlet, and that extraction of any desired flow from the compressor discharge does not significantly impact the rest of the cycledeck.

A subset of icing boundary code (i.e., code for a calculated boundary that defines a minimum required compressor inlet temperature to avoid ice formation on the initial stages of the compressor) may be duplicated inside the solver and is used to determine a required compressor inlet temperature based on ambient conditions as well as ARES outputs calculated during the previous iteration of the solver. The enthalpy of this required compressor inlet temperature may be determined as well as the enthalpies of the ambient air and the compressor discharge air. The required IBH flow is then computed based on an energy balance derived from the enthalpies as:

$$W_{IBH} = \frac{W_{comp\,inlet} \times h_{comp\,inlet} - W_{inlet} \times h_{inlet}}{h_{comp\,disch}}$$

The calculated IBH flow is then clamped between zero and a specified percentage of compressor flow. When the EMB is enabled and a projected machine CRT (i.e., projected by the solver) is below the CRT that defines emissions compliance, this full IBH flow is used in the model. If the ambient temperature is greater than the required compressor inlet temperature (CTIM), zero IBH flow is used, unless the EMB is active and CRT is below the minimum (in which case the maximum IBH flow is again used). The IBH flow selected after the clamp is then fed into a second heat balance equation to determine the expected CTIM, which may or may not be equal to the value required by anti-icing logic. The actual CTIM value is used by some logic external to the solver as well as by the next iteration of the solver logic itself. In the exemplary embodiment, the selected IBH flow is also fed into the ARES models on the next iteration.

A number of the machine boundaries, such as TFire, are scheduled as a function of other machine parameters. Since these scheduled boundaries affect the available operating space, a mechanism is provided to follow these schedules as the solver operates. Specifically, after each solver iteration, an updated ARES output state is supplied to the relevant interpolation blocks (or other schedules) to derive the appropriate boundary values. Both ARES input and output states are available, and some boundaries may be scheduled as functions of inputs as well. These interpolated boundaries are fed back into the solver on the next iteration. Inclusion of the boundaries in this way effectively turns the ARES model, boundaries, and IBH model into a single very large nonlinear equation for which fuel flow and IGV angle are the inputs and all modeled cycle parameters are the outputs.

After a given corner point 204 has been computed, the megawatt output and exhaust temperature at the point are exported from the solver along with several auxiliary values. In the exemplary embodiment, storage of the values for each corner point 204 is accomplished by using a series of move blocks, the enable pins on which are connected to rungs that output a true value only when the associated corner point 204 is selected in the logic and the convergence flag is set. In this way, only a valid result updates the stored value. These stored values may be placed on Ethernet global data (EGD) for display on computing device 300 and/or other computing devices. Further, the values may be stored in memory device 310. An additional Boolean value, containing the last convergence status for that point's computation, may be latched for each corner point 204. This logic latches true when a point is selected and converges; the true value is latched until such time as the point is selected and does not converge. These status bits are used only for monitoring convergence status of each point and do not feed into any additional logic. That is, if the solver calculations converge within a predetermined number of iterations, the megawatt output and exhaust temperature corresponding to the corner point are saved for display. If the solver fails to converge within the predetermined number of iterations, no megawatt or temperature values are saved. Instead, the external logic continues to store the most recent valid result. In the exemplary embodiment, a separate Boolean flag is maintained for each corner point to indicate whether or not that corner point calculation converged during its last attempted calculation.

The systems and methods described herein facilitate calculating and displaying an operating space for a gas turbine in real time, allowing operators to see how close the machine is to operating boundaries. Because the calculations are based on a current machine state, including sensed inputs, the displayed operating space automatically adapts to changing ambient conditions. Further, since the computed corner points take scheduled boundaries into account, the computed points are updated in near-real time as plant operators change operating modes of a power plant, toggle boundaries, etc. Accordingly, the systems and methods described herein enable plant operators to make real-time predictions based on their selections and/or ambient conditions.

The embodiments described herein may be used to translate control curves expressed as functions of internal gas turbine model states into parameters that are easily understood by power plant operators, such as power output and exhaust temperature. This knowledge helps operators understand the capabilities of their gas turbines in real time rather than resorting to published tables. Further, the continuous execution of the solver assists operators in observing how turbine output changes with changing ambient temperature, humidity, fuel supply characteristics, etc. Based on this knowledge, plant operators may alter how they operate their plant to facilitate prioritizing one parameter over another.

At least one technical effect of the systems and methods described herein includes (a) determining a current operating point of a gas turbine; (b) calculating, based on the current operating point, an operating space for the gas turbine by solving for a plurality of corner points that define the operating space; and (c) displaying to a user a graph that includes the calculated operating space and the current operating point.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A system comprising:
   a gas turbine, the gas turbine having an operating space during operation and a current operating point during operation; and
   a computing device communicatively coupled to said gas turbine and configured to:
   determine the current operating point of said gas turbine based on sensed inputs from said gas turbine;
   calculate, based on the current operating point of said gas turbine, the operating space for said gas turbine by solving for a plurality of corner points that define the operating space by iteratively solving for the plurality of corner, wherein iteratively solving for the plurality of corner points includes:
   setting an initial state vector;
   calculating a difference vector;
   assembling a Jacobian matrix; and
   generating an updated state vector based on the initial state vector, the difference vector, and the Jacobian matrix;
   display, to a user, a graph that includes the calculated operating space and the current operating point;
   receive, from the user, a command to transition the gas turbine to a new operating point based on graph of the calculated operating space; and
   transition the gas turbine to the new operating point.

2. A system in accordance with claim 1, wherein the current operating point is defined by a current exhaust temperature and a current output power for said gas turbine.

3. A system in accordance with claim 1, wherein solving for a plurality of corner points includes iteratively solving for the plurality of corner points using the current operating point as an initial guess.

4. A system in accordance with claim 3, wherein iteratively solving for the plurality of corner points includes:
   setting the current operating point as the initial state vector;
   calculating the difference vector as a difference between the initial state vector and the plurality of corner points;
   perturbing the current operating point to estimate partial derivatives of the current operating point;
   assembling the Jacobian matrix from the estimated partial derivatives;
   inverting the Jacobian matrix;
   multiplying the inverted Jacobian matrix by the difference vector to generate a change vector; and
   adding the change vector to the initial state vector to generate the updated state vector.

5. A system in accordance with claim 4, wherein perturbing the current operating point includes perturbing the current operating point to estimate partial derivatives of the current operating point with respect to fuel flow and an inlet guide vane angle of said gas turbine.

6. A system in accordance with claim 1, wherein said computing device is configured to calculate the operating space during operation of said gas turbine.

7. A system in accordance with claim 1, wherein to display a graph, said computing device is further configured to display a graph that includes an emissions boundary and an exhaust flow boundary for said gas turbine.

8. A computing device comprising:
a communications device configured to communicatively couple the computing device to a gas turbine having an operating space during operation and a current operating point during operation;
a memory device configured to store the current operating point of the gas turbine derived from sensed inputs from the gas turbine;
a processor communicatively coupled to said memory device and configured to calculate, based on the current operating point, the operating space for the gas turbine by solving for a plurality of corner points that define the operating space by iteratively solving for the plurality of corner points, wherein iteratively solving for the plurality of corner points includes:
setting an initial state vector;
calculating a difference vector;
assembling a Jacobian matrix; and
generating an updated state vector based on the initial state vector, the difference vector, and the Jacobian matrix;
a display device communicatively coupled to said processor, said display device configured to display a graph that includes the calculated operating space and the current operating point, wherein said processor is configured to:
receive, from a user, a command to transition the gas turbine to a new operating point based on graph of the calculated operating space; and
transition the gas turbine to the new operating point.

9. A computing device in accordance with claim 8, wherein the current operating point is defined by a current exhaust temperature and a current output power for the gas turbine.

10. A computing device in accordance with claim 8, wherein solving for a plurality of corner points includes iteratively solving for the plurality of corner points using the current operating point as an initial guess.

11. A computing device in accordance with claim 10, wherein iteratively solving for the plurality of corner points includes:
setting the current operating point as the initial state vector;
calculating the difference vector as a difference between the initial state vector and the plurality of corner points;
perturbing the current operating point to estimate partial derivatives of the current operating point;
assembling the Jacobian matrix from the estimated partial derivatives;
inverting the Jacobian matrix;
multiplying the inverted Jacobian matrix by the difference vector to generate a change vector; and
adding the change vector to the initial state vector to generate the updated state vector.

12. A computing device in accordance with claim 11, wherein perturbing the current operating point includes perturbing the current operating point to estimate partial derivatives of the current operating point with respect to fuel flow and an inlet guide vane angle of the gas turbine.

13. A computing device in accordance with claim 8, wherein said processor is configured to calculate the operating space during operation of the gas turbine.

14. A computing device in accordance with claim 8, wherein to display a graph, said display device is further configured to display a graph that includes an emissions boundary and an exhaust flow boundary for the gas turbine.

15. A method for operating a gas turbine having an operating space during operation and a current operating point during operation, said method comprising:
determining, using a computing device communicatively coupled to the gas turbine, the current operating point of the gas turbine based on sensed inputs from the gas turbine;
calculating, using the computing device, based on the current operating point, the operating space for the gas turbine by solving for a plurality of corner points that define the operating space by iteratively solving for the plurality of corner, wherein iteratively solving for the plurality of corner points includes:
setting an initial state vector;
calculating a difference vector;
assembling a Jacobian matrix; and
generating an updated state vector based on the initial state vector, the difference vector, and the Jacobian matrix;
displaying to a user, using the computing device, a graph that includes the calculated operating space and the current operating point;
receive, from the user, a command to transition the gas turbine to a new operating point based on graph of the calculated operating space; and
transition the gas turbine to the new operating point.

16. A method in accordance with claim 15, wherein determining the current operating point comprises determining the current operating point defined by a current exhaust temperature and a current output power for the gas turbine.

17. A method in accordance with claim 15, wherein solving for a plurality of corner points comprises iteratively solving for the plurality of corner points using the current operating point as an initial guess.

18. A method in accordance with claim 17, wherein iteratively solving for the plurality of corner points comprises:
setting the current operating point as the initial state vector;
calculating the difference vector as a difference between the initial state vector and the plurality of corner points;
perturbing the current operating point to estimate partial derivatives of the current operating point;
assembling the Jacobian matrix from the estimated partial derivatives;
inverting the Jacobian matrix;
multiplying the inverted Jacobian matrix by the difference vector to generate a change vector; and
adding the change vector to the initial state vector to generate the updated state vector.

19. A method in accordance with claim 18, wherein perturbing the current operating point comprises perturbing the current operating point to estimate partial derivatives of the current operating point with respect to fuel flow and an inlet guide vane angle of the gas turbine.

20. A method in accordance with claim 15, wherein calculating the operating space comprises calculating the operating space during operation of the gas turbine.

\* \* \* \* \*

UNITED STATES PATENT AND TRADEMARK OFFICE
CERTIFICATE OF CORRECTION

PATENT NO.         : 9,897,013 B2
APPLICATION NO.    : 14/843009
DATED              : February 20, 2018
INVENTOR(S)        : Benjamin David Laskowski It is certified that error appears in the above-identified patent and that said Letters Patent is hereby corrected as shown below:

In the Specification

Column 7, Line 61, delete "$\dfrac{\partial TTXM}{\partial IGV}, \dfrac{\partial WATT}{\partial IGV}, \dfrac{\partial TFire}{\partial IGV}, \dfrac{\partial CRT}{\partial IGV},$ and $\dfrac{\partial WX}{\partial IGV}.$" and insert therefor -- $\dfrac{\partial TTXM}{\partial IGV}, \dfrac{\partial DWATT}{\partial IGV}, \dfrac{\partial TFire}{\partial IGV}, \dfrac{\partial CRT}{\partial IGV},$ and $\dfrac{\partial WX}{\partial IGV}.$ --.

Signed and Sealed this
Twenty-fifth Day of June, 2019

Andrei Iancu
*Director of the United States Patent and Trademark Office*